United States Patent [19]
Kadokawa

[11] Patent Number: 5,184,402
[45] Date of Patent: Feb. 9, 1993

[54] METHOD OF INSTALLING ROLLER BEARING

[75] Inventor: Satoshi Kadokawa, Fujisawa, Japan

[73] Assignee: Nippon Seiko Kabushiki Kaisha, Tokyo, Japan

[21] Appl. No.: 738,813

[22] Filed: Aug. 1, 1991

Related U.S. Application Data

[62] Division of Ser. No. 577,542, Sep. 5, 1990, Pat. No. 5,059,040.

[51] Int. Cl.⁵ .............................................. F16C 43/00
[52] U.S. Cl. ........................... 29/898.07; 29/898.062; 29/898.09; 29/423
[58] Field of Search .............. 29/898.07, 898.062, 29/898.09, 423; 384/448, 624, 559, 584, 510

[56] References Cited

U.S. PATENT DOCUMENTS

| | | | |
|---|---|---|---|
| 2,215,134 | 9/1940 | Rehnberg | 29/423 |
| 2,860,406 | 11/1958 | Reichardt | 29/898.062 X |
| 3,345,723 | 10/1967 | Stilla et al. | 29/898.07 |
| 4,166,660 | 9/1979 | Murphy | 384/448 |
| 4,398,777 | 8/1983 | Murphy | 384/448 |
| 4,995,736 | 2/1991 | Haase et al. | 384/448 |

Primary Examiner—Mark Rosenbaum
Assistant Examiner—S. Thomas Hughes
Attorney, Agent, or Firm—Helfgott & Karas

[57] ABSTRACT

A method of installing a roller bearing using a spacer made of an elastic material and supported in a space defined a plurality of rollers of the roller bearing, which spacer has at least a leading section having a tapered surface progressively reduced in diameter to the leading end of the spacer and at least two contact support sections having a maximum diameter of the spacer.

5 Claims, 5 Drawing Sheets

METHOD OF INSTALLING ROLLER BEARING

CROSS REFERENCE TO RELATED APPLICATION

This application is Rule 1.60 division of application Ser. No. 577,542 filed Sep. 5, 1990, now U.S. Pat. No. 5,059,040.

BACKGROUND OF THE INVENTION

1. Field of the Invention

The present invention relates to a rolling bearing such as a roller bearing equipped with a spacer for installation and to a method for installing this rolling bearing, and, in particular, to a rolling bearing utilized in the assembly of a cam follower incorporated, for example, in a valve drive mechanism of an engine.

2. Description of the Prior Art

Conventionally, in a reciprocating piston engine used, for example, to propel an automobile, with the exception of certain two-cycle engines, intake and exhaust valves are provided which open and close in synchronism with the rotation of a crank shaft.

Devices of various configurations exist as a valve drive mechanism for driving these intake and exhaust valves. For example, in the SOHC type shown in FIG. 11, an intake valve 4 and an exhaust valve 5 are reciprocally driven through a pair of rocker arms 3 by a single camshaft 2 rotating at one half the speed of a crankshaft 1 (in the case of a 4-cycle engine). A pair of cams 6 secured to the camshaft 2 which rotates in synchronism with the crankshaft 1 slidingly contact the end sections of the rocker arms 3 and reciprocatingly drive an intake valve 4 and an exhaust valve 5.

In recent years, a rotating cam follower device which rotates along with the rotation of the cams 6 has been provided between the opposing parts, for example between the cam 6 and the rocker arm 3. This cam follower reduces the frictional forces between the peripheral faces of the cams 6 and the opposing members such as the rocker arms 8, the push rods (in an OHV type engine), the valves (in some DOHC-type engines), and the like, when the engine is running. This is designed to reduce the fuel consumption ratio when the engine is running.

This type of cam follower device is illustrated in FIG. 12 and FIG. 13. A pair of first and second support wall sections 7 are provided at one end of the rocker arms 3 with a space therebetween to support between them a part which opposes the cam 6. Each end of a shaft 8 is securely supported by one of the pair of support wall sections 7. A roller bearing comprising a plurality of rollers 9 and a short, cylindrical outer ring 10 is provided around the shaft 8. The outer peripheral surface of the outer ring 10 contacts the outer peripheral surface of the cam 6, so that this outer ring 10 rotates around the shaft 8 with the rotation of the cam 6.

By the provision of the roller bearing with this type of outer ring 10, the friction between the cam 6 and the parts which oppose the cam 6, such as the rocker arm 3 and the like is converted from sliding friction to rotational friction, thus reducing the fuel consumption ratio.

When installing the roller bearing between the two support wall sections 7 of the cam follower device described above, the rollers 9 provided inside the outer ring 10 must be maintained in a state where they will not become detached from the inner peripheral surface of the outer ring 10.

When the rollers 9 of the roller bearing are shipped from the factory, they are lightly attached to the inner peripheral surface of the outer ring 10 by a coating of grease. However, it is possible for some of the rollers 9 to become separated from the inner peripheral surface of the outer ring 10 due to vibration during transportation or impact during the installing operation, or the like.

If the rollers 9 which become separated from the inner peripheral surface of the outer ring 10 are completely detached from the inner peripheral surface of the outer ring 10, the load carried by the roller bearing is decreased as the number of rollers is reduced. Therefore, the life expectancy of the cam follower device is reduced. In addition, if the rollers 9 separated from the inner peripheral surface of the outer ring 10 remain inside the outer ring 10, these remaining rollers 9 become an obstacle to the insertion of the shaft 8, so that the cam follower device cannot be assembled.

As conventional technology to eliminate this type of inconvenience, the technology as disclosed in Japanese Laid Open U.M. Patents Nos. S64-36603 and S64-36604 is known. In this conventional technology, a spacer is further provided inside the rollers 9 within the outer ring 10. Prior to installing the roller bearing, the rollers 9 are secured by this spacer so that they do not separate from the inner peripheral surface of the outer ring 10. Then, as the shaft 8 is inserted into the space defined by the rollers 9, the spacer is pushed out from this space.

Commonly known shapes for the spacer to be installed inside the rollers 9 are shown in FIG. 14 to FIG. 17. The spacer 11 illustrated in FIG. 14 and FIG. 15 for preventing the detachment of the rollers q resembles a spacer for preventing the separation of a split inner ring described in "Compilation of Commonly Known and Conventional Technology" published by the Japanese Patent Office on Dec. 28, 1973. The spacer 11 of a synthetic resin such as nylon is formed in a cylindrical member With a notch or cutout formed in one part of the member, so that the outer diameter of the member is compressed elastically. Another type of spacer 12 shown in FIG. 16 is disclosed in US Patent No. 4166660. The spacer 12 is a metal plate spring formed in a W-shape.

Each of the spacers 11, 12 formed as described above is installed inside the space defined by the rollers 9 mounted inside the outer ring 10 and supports the rollers 9 from inside to prevent them from becoming detached from the inner peripheral surface of the outer ring 10 as a result of vibration during transportation of the roller bearing or from impact during the installing operation, or the like.

To perform the installing operation, the roller bearing comprising the outer ring 10 and the rollers q is inserted between the pair of support wall sections 7 formed at the ends of the rocker arms 3, with the spacer 11 or the spacer 12 still placed in the space defined by the rollers 9. The shaft 8 for supporting the roller bearing is then inserted from the outside (the left side in FIG. 14) into a first through-hole 13a formed in the first support wall section 7 (the left wall section in FIG. 14). Next, the leading end of the shaft 8 is passed through the space defined by the rollers 9 of the roller bearing, and is inserted into a second through-hole 13b formed in the second support wall section 7 (the right wall section in FIG. 14).

The insertion of the shaft 8 causes the spacer 11 or the spacer 12 to be pushed out of the space defined by the rollers 9 to be ejected from the second through-hole 13b formed in the second support wall section 7 for recovery.

In the configuration shown in FIG. 14, the inner diameter of the first through-hole 13a into which the shaft s is first inserted (the left side in FIG. 14) is slightly larger than the outer diameter of the shaft 8. Because of this, the occurrence of damage at the middle section of the outer peripheral surface of the shaft 8 which may contact the rollers 9 is prevented. At the same time, the inner diameter r of the second through-hole 13b on the leading side in the direction of shaft insertion is slightly smaller than the outer diameter of the shaft 8. As a result, after the insertion of the shaft 8 is completed, even before the two ends of the shaft 8 are crimped for edge expansion, the positional relationship of the shaft 8 and the rocker arm 3 cannot be shifted.

However, the efficiency of the installing operation is not necessarily good when the roller bearing is installed using the spacers 11, 12 with the shapes described above.

For example, in the case of the spacer 11 shown in FIG. 14 and FIG. 15, the outer peripheral edge of the leading end of the spacer 11 (the right end in FIG. 14) is apt to strike the inner peripheral edge of the second through-hole 13b. If this occurs, the spacer 11 cannot be extracted from the space defined by the rollers 9, so the insertion of the shaft 8 does not proceed smoothly. This causes the installing operation for the roller bearing to worsen.

In the publication "Compilation of Commonly Known and Conventional Technology", the chamfering of the outer peripheral edge of both ends of the spacer has been documented. However, when the thickness of the spacer is reduced to the point where the outer diameter of the spacer 11 can easily reduced or deformed, such a thin spacer results in insufficient chamfering.

In addition, one or some of the rollers 9 can drop into the notch or cutout formed in part of the cylindrical member so that it is possible for this roller or these rollers 9 to project to the inside more than the other rollers 9. In such a case, the roller 9 which has fallen into the notch or cutout hinders the insertion of the shaft 8.

Accordingly, the spacer 11 shown in FIG. 14 and FIG. 16, as recorded in "Compilation of Commonly Known and Conventional Technology" is satisfactory for preventing separation of the inner ring, but is not necessarily suitable for supporting the rollers 9. In particular, in the case where rollers with a small outer diameter (needles) are used, the rollers 9 tend to fall into the notch or cutout very easily, which tends to be a problem.

With the spacer 12 formed from a metal plate spring as shown in FIG. 16, the operation to mount the spacer 12 inside the rollers 9 is troublesome. In addition, there is concern that the roller bearing will deteriorate because of rusting of the metal plate spring from which the spacer 12 is formed. Also, because it is difficult to use the spacer 12 repeatedly because of the loss of spring force in the metal plate spring, an increase in the cost of installing the roller bearing is unavoidable.

Consideration has been given to the use of a barrel-shaped spacer 14 as shown in FIG. 17. The barrel-shaped spacer 14 has a diameter h of the outer periphery at each end which is considerably smaller than the inner diameter r of the second through-hole 13b (r>h) as shown in FIG. 14. As a result, the ends of the spacer 14 can be smoothly fed into the second through-hole 13b.

However, when the entire outer peripheral surface of the simple barrel-shaped spacer 14 is spherical, even when the spacer 14 has been inserted into the space defined by the rollers 9, this spacer 14 tends to change position from a rocking or oscillating motion around the contact parts of the rollers 9. If this positional change becomes large, the end surface of the spacer 14 hits against the inner peripheral edge section of the second through-hole 13b, so that it is very difficult to extract the spacer 14 from the space defined by the rollers 9.

SUMMARY OF THE INVENTION

An object of the present invention is to provide, with due consideration to the drawbacks of such conventional devices, a rolling bearing such as roller bearing equipped with a spacer for installation and a method for installing this rolling bearing wherein the positional relationship of a shaft and a rocker arm cannot deviate, efficiency of the installing operation is good, and the spacer is easily removed as the rolling bearing is installed.

This object is achieved in the present invention by the provision of a rolling bearing equipped with a spacer for installation and a method for installing this rolling bearing in which the spacer is fabricated from an elastic material and is tapered at the leading section in the direction in which the shaft is inserted, so that the outer diameter of the leading section becomes progressively smaller toward the leading end. The outer diameter at the leading section of the spacer in the axial direction of insertion is smaller than the inner diameter of a first through-hole which the shaft is first inserted into. The spacer is formed with a contact support section in at least two, slightly separated positions at its middle section, and the contact support sections have the same outer diameter which is not smaller than the outer diameter of the other sections. In other words, the contact support sections have a maximum diameter of the spacer. When the rolling bearing is assembled, the spacer remains supported in a space defined by a plurality of rollers. In this state, the spacer does not oscillate and move in the space defined by the rollers. The leading end of the shaft is then passed through the space defined by the rollers. By this means the spacer is pushed through the second through-hole to the outside of a support wall section. The spacer in which the leading section is tapered in the direction of insertion is reliably pushed out as the shaft is pushed in, and the installation of the roller bearing is accomplished smoothly.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
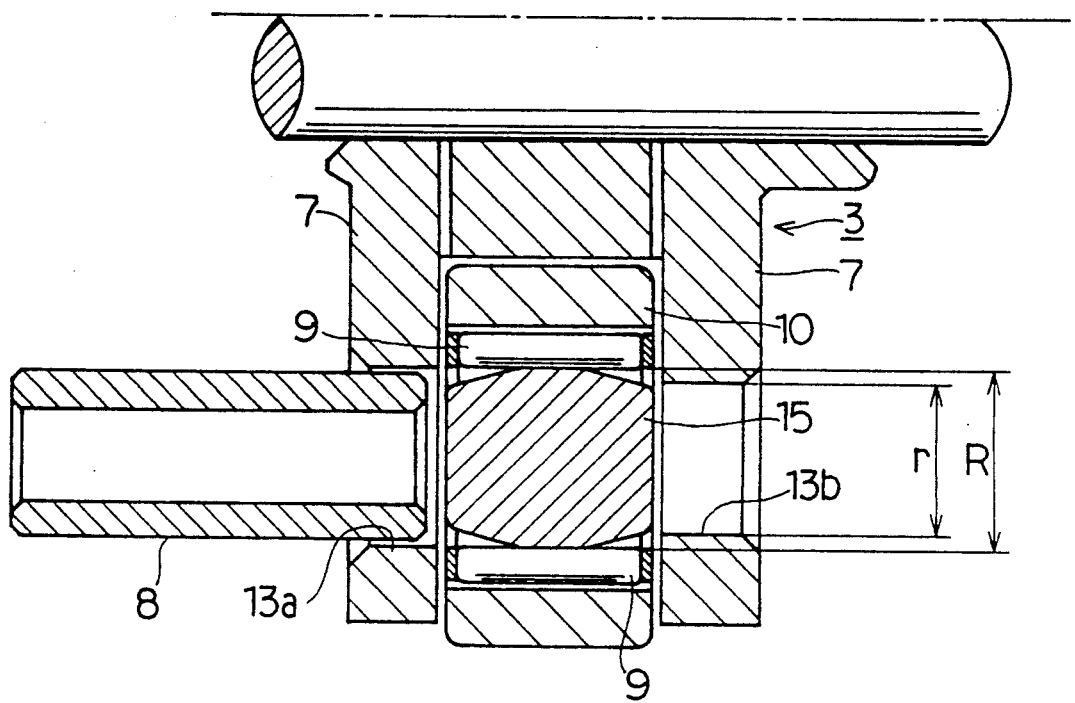
FIG. 1 is a cross sectional view of a first embodiment of the present invention showing a roller bearing installed between a pair of rocker arms.
Figure 2:
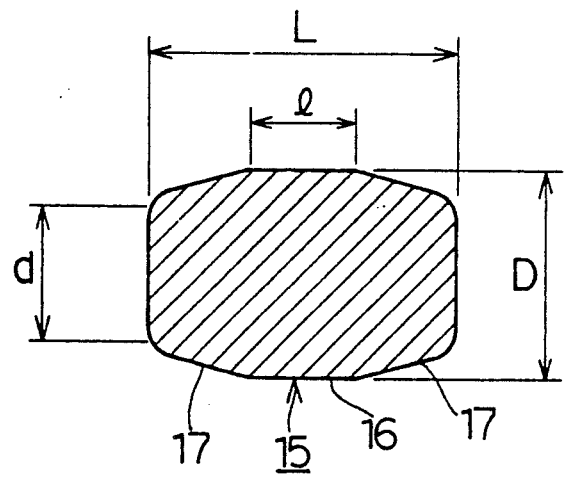
FIG. 2 is a cross sectional view of a first embodiment of a spacer of the present invention.

In a first embodiment of the present invention shown in FIG. 1 and FIG. 2, a spacer 15 is formed as an integral body from an elastic material, such as rubber or the like, with a hardness of about, for example, Hs 60 to 80.

In the middle section of the spacer 16, a cylindrical section 16 is formed acting as a support section and extending in the axial direction (the lateral direction in FIG. 1 and FIG. 2) generally with a constant diameter. The outer periphery of the cylindrical section 16 at both axial ends thereof has the function of a contact support section to press against the inner peripheral side of a plurality of rollers 9. A tapered section 17 which is a guide surface section and tapers to form a tapered or conical surface is provided at each end section of the spacer 15 so that the outer diameter becomes progressively smaller in the direction toward the end thereof.

In a free condition, the outer diameter D of the cylindrical section 16 is just a little larger (e.g. 0.05 to 0.5 mm) than the diameter R of a circle formed by the space defined by the rollers 9 provided on the inner peripheral surface of an outer ring 10 (D=R+(0.05 to 0.5 mm). As a result, when the spacer 15 is pressed into the space defined by the rollers 9, the outer diameter of the cylindrical section 16 is subjected to a slight elastic compression.

In addition, the diameter d of the outer periphery of the leading section of the tapered section 17 is substantially smaller than the inner diameter r of a second through-hole 13b formed in a second support wall section 7 on the leading side in the input direction of a shaft 8 (r>d). As a result, the leading end of the tapered section 17 can easily penetrate the second through-hole 13b.

The proportion of the length l of the cylindrical section 16 (the distance by which the contact support sections are separated) in the support section to the full length L of the spacer 15 is in the range of 1/6 to ½ (l=(1/6 to ½)L). As a result, the outer peripheral surface of the cylindrical section 16 extends for a length sufficient to contact the rollers 9.

When the spacer 15 fabricated in this manner is pressed into the space defined by the rollers 9 mounted on the inner peripheral surface of the short cylindrical outer ring 10, the roller bearing with spacer for installation is ready for installing . When this type of elastic spacer 15 is pressed into the space defined by the rollers 9, each of the rollers 9 is reliably prevented from becoming detached from the inner peripheral surface of the outer ring 10.

In addition, when the spacer 15 is pressed into the space defined by the rollers 9, the outer peripheral surface of the cylindrical section 16 formed in the middle section of the spacer 15 elastically contacts the rollers The spacer 15 is therefore maintained concentrically with the outer ring 10 inside the outer ring 10, and the spacer 15 cannot deviate from its position inside the outer ring 10.

After the spacer 15 of the abovementioned configuration is installed to provide the roller bearing with a spacer for installation as outlined above, this roller bearing is installed between a pair of first and second support wall sections 7 formed on the end section of, for example, a rocker arm 3, as shown in FIG. i.

In the installing operation, the roller bearing with the spacer 15 maintained in the space defined by the rollers 9 is inserted between the pair of first and second support wall sections 7. The shaft 8 for supporting the roller bearing is then inserted from the outside (the left side in FIG. 1) into a first through-hole 13a formed in the first support wall section 7 (the left one in FIG. 1). Subsequently, the leading end of the shaft 8 is passed through the space defined by the rollers 9 which form the roller bearing to penetrate the second through-hole 13b formed in the second support wall section 7 (the right one in FIG. 1).

Coincident with this operation of inserting the shaft 8, the spacer 15 is pressed out from the space defined by the rollers 9 and ejected from the second through-hole 13b in the second support wall section 7 for recovery.

In the present invention as described, the elastic contact between the outer peripheral surface of the cylindrical section 16 formed in the middle of the spacer 15 and the rollers 9 maintains the spacer 15 inside the outer ring 10, concentric with the outer ring 10. The spacer 15 is then unable to deviate from its position inside the outer ring 10. In addition, it is not possible for any of the rollers 9 to drop into the notch or cutout formed in part of the cylinder and project to the inside more than the other rollers 9. Therefore, the insertion of the shaft 8 can be reliably performed. As the insertion progresses, the leading end (the right side in FIG. I) of the tapered section 17 of the spacer 15 is reliably inserted into the second through-hole 13b.

The insertion of the shaft 8 is thus easily and reliably carried out, and there is no loss in efficiency of the installing operation of the roller bearing.

In the embodiments illustrated in the drawings, the spacer 15 is shown as a solid body fabricated from an elastic material. However, the spacer 15 can also be formed as a hollow cylindrical body.

Figure 4:
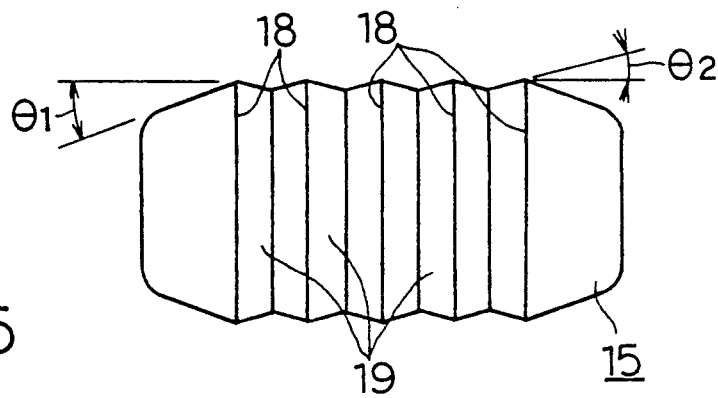
FIG. 4 is a side elevational view of a third embodiment of the spacer of the present invention.
Figure 8:
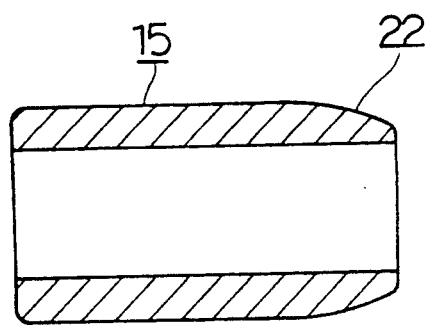

In addition, the outer peripheral shape of the middle section of the spacer 15 can be either of the shapes shown in FIG. 8 and FIG. 4 in place of the cylindrical section outlined above to circumferentially support the inner peripheral side of the rollers 9 at two positions or more, spaced in the axial direction.

Figure 3:
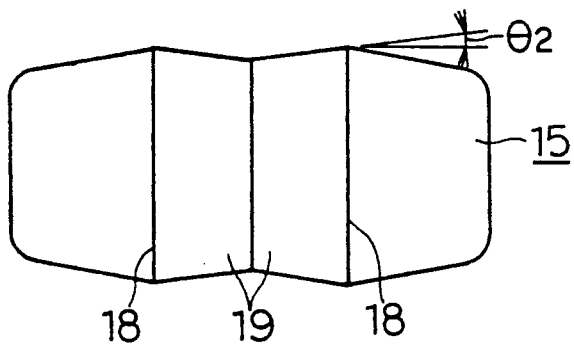
FIG. 3 is a side elevational view of a second embodiment of the spacer of the present invention.

A second embodiment shown in FIG. 3 has a pair of contact support sections 18 which are spaced from each other in the axial direction of the support section on the outer peripheral surface of the spacer 15 and have an outer diameter greater than that of the other sections. Also, a third embodiment shown in FIG. 4 is formed with five contact support sections 18 spaced from each other in the axial direction of the support section on the outer peripheral surface of the spacer 15, also with an outer diameter greater than that of the other sections.

In the case of the second and the third embodiments, the spacer 15 is supported in a level manner in the space defined by the rollers 9. Accordingly, the spacer 18 is smoothly ejected when the shaft 8 is inserted.

Figure 6:
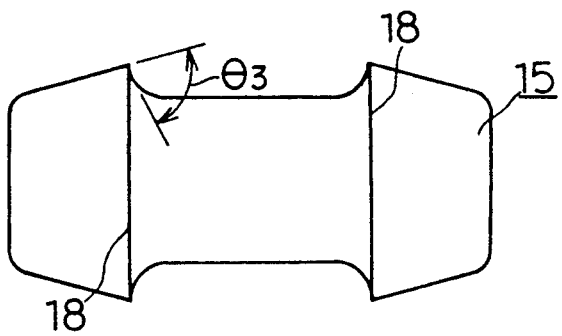
FIG. 6 is a side elevational view showing an undesirable spacer shape.

However, in the case of the second and the third embodiments, the angle $\theta_2$ of inclination of a plurality of cone-shaped inclined surfaces 19 between the adjoining contact support sections 18 is smaller than the angle $\theta_1$ of inclination of a plurality of tapered sections 17 formed at the end sections of the spacer 15 ($\theta_1 > \theta_2$). This is to ensure that when the spacer 15 is being ejected, the outer peripheral surface of the spacer 15 is not damaged on the peripheral edge of the opening of the second through-hole 13b (FIG. 1). For example, as shown in FIG. 6, when a section with a large angle $\theta_3$ of inclination is provided between the contact support sections 18, the peripheral edge of the opening of the second through-hole 13b cuts into this section with the angle $\theta_3$ and the ejection of the spacer 16 cannot proceed smoothly as the shaft 8 is inserted. The first embodiment can be considered as a form of the second or third embodiment wherein the angle $\theta_2$ of inclination is zero ($\theta_2 = 0$).

Figure 7:
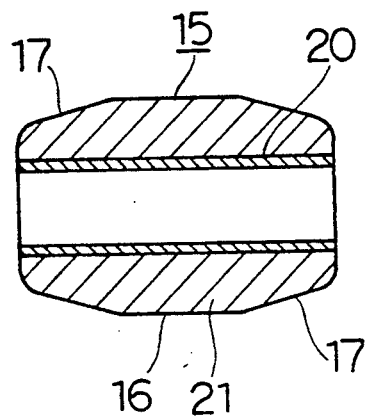
FIG. 7 to FIG. 10 are cross sectional views illustrating fourth to seventh embodiments respectively of the spacer of the present invention.

Next, FIG. 7 shows a fourth embodiment of the spacer of the present invention. A metal cylindrical member 20 is inserted through the inside of a hollow, cylindrical main spacer body 21 made of rubber. This ensures the rigidity of the entire body of the spacer 15.

FIG. 8 shows a fifth embodiment of the spacer of the present invention. The outer peripheral surface of the leading section of the rubber spacer 18 is a curved surface 22 with its cross sectional shape being the arc of a circle. The outer diameter of the leading section of the spacer 15 becomes progressively smaller toward the leading end because of this curved surface 22.

Figure 9:
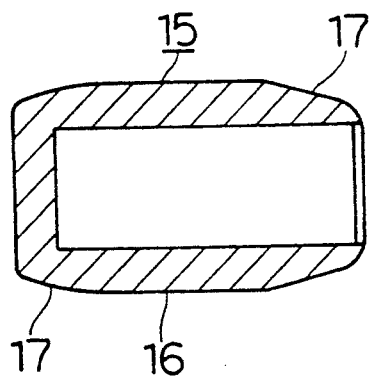

Next, FIG. 9 shows a sixth embodiment of the spacer of the present invention. The rubber spacer 15 is formed as a cylindrical member with a bottom. This spacer 15 is made unsymmetrical in a front and back direction, but there is no restriction on the direction of insertion. On this point, the sixth embodiment differs from the fifth embodiment in which the direction of insertion is restricted.

Figure 10:
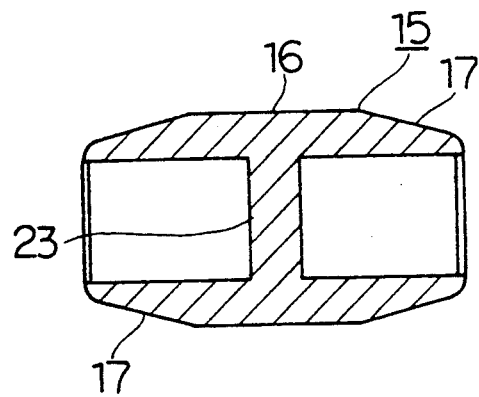
Figure 11:
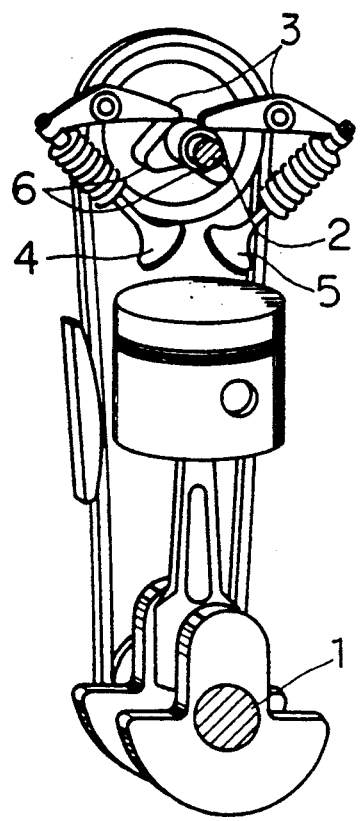
FIG. 11 is a partly cross sectional, perspective view showing the principles of an SOHC engine with a rocker arm which is one example of an object on which a roller bearing is mounted by means of the method of the present invention.
Figure 12:
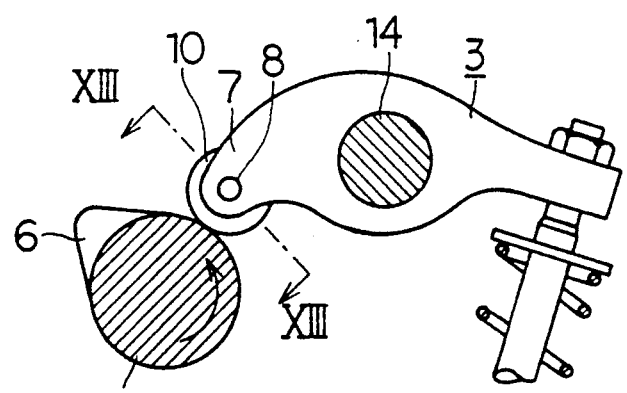
FIG. 12 ia a partly cross sectional, front elevational view of a rocker arm and related members including a roller bearing installed in accordance with the present invention.
Figure 13:
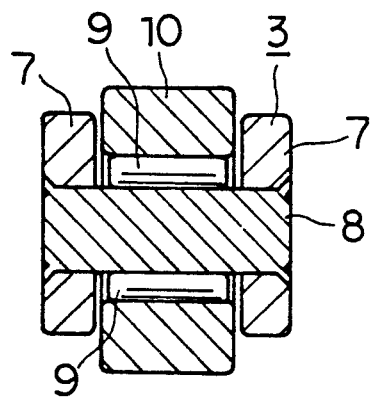
FIG. 13 is a sectional drawing viewed along the section XIII—XIII in FIG. 12.
Figure 14:
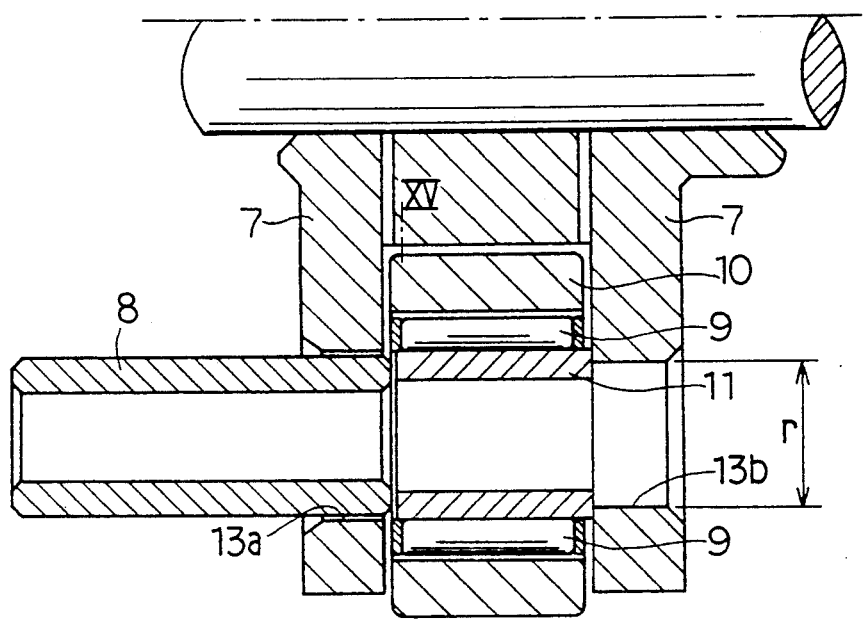
FIG. 14 is a cross sectional view showing the state of a roller bearing installed between a pair of rocker arms wherein a conventional spacer is incorporated.
Figures 15, 16:
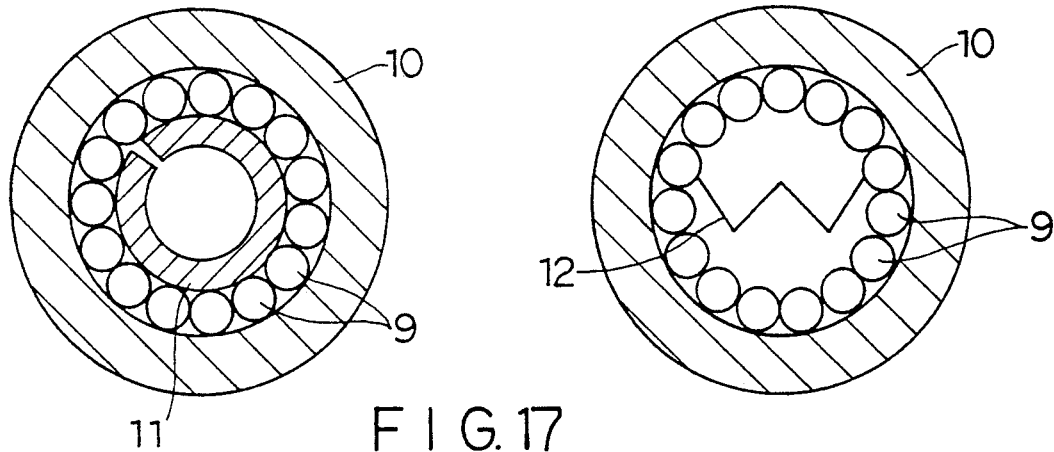
FIG. 15 is a cross sectional view taken along the line XV—XV in FIG. 14.
FIG. 16 is a cross sectional view corresponding to FIG. 15 showing a roller bearing wherein a conventional spacer of another shape is incorporated.
Figure 17:
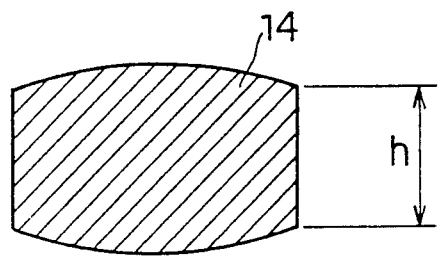
FIG. 17 is a cross sectional view showing yet another example of a conventional spacer.

Next, FIG. 10 shows a seventh embodiment of the spacer of the present invention. The spacer 15 is made of a rubber in a cylindrical shape with a dividing wall 23 provided in the middle section. The dividing wall 23 ensures that the spacer 18 generally remains rigid.

Figure 5:
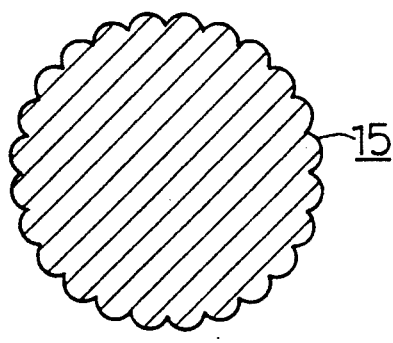
FIG. 5 is a cross sectional view of another example of the spacer of the present invention.

Furthermore, in each of these embodiments, the cross sectional shape of the contact support section for elastically supporting the rollers 9 from inside does not necessarily have to be a &rue circle. Specifically, if all the rollers 9 can be elastically supported it is possible to adopt a cross sectional shape such as that shown in FIG. 5.

As outlined in the foregoing explanation, in the roller bearing equipped with a spacer for installation and the method for installing this roller bearing of the present invention, not only is the operation of mounting the spacer in the space defined by the rollers easily performed, but as the shaft is inserted into this space, it is possible to reliably press the spacer out, so that the efficiency of installing the roller bearing is improved.

In addition, because it is possible to repeatedly use the elastic spacer, there is no increase in the cost of the installing operation for the roller bearing.

While the invention has been described in detail herein in accordance with preferred embodiments thereof, many modifications and changes may be effected by those skilled in the art.

For example, although a curved section having a curved surface 22 and a tapered section 17 are used in the embodiments, another shapes may be adopted to define a peripheral guide surface having an outer diameter progressively reduced to the end thereof.

Further, although the curved surface 22 or the tapered section 17 is formed at either side of the spacer 16, the peripheral guide surface such as the curved surface 22 or the tapered section 17 may be formed only on one side of the spacer.

In addition, the proportion of the length of the middle section 16 (the distance by which the contact support sections are separated) to the full length of the spacer 15 is in the range of 1/6 to ⅓ to provide the outer peripheral surface of the cylindrical section 16 with a length sufficient to contact the rollers 9 in the embodiments mentioned above However, the middle section 16 may have an axial length longer than ⅓ of the spacer length when the peripheral guide surface such as the curved surface 22 or the tapered section 17 has a sufficient axial length of at least 1/6 of the spacer length on at least one axial side of the spacer. For example, the middle section 16 may have a length of 5/6 of the spacer length when a single peripheral guide surface has the rest of the spacer length.

Accordingly, it is intended by the appended claims to cover all such modifications and changes as fall within the scope of the invention.

What is claimed is:

1. A method of installing a roller bearing comprising the steps of:

providing a roller bearing comprising an outer ring and a plurality of rollers provided in said outer ring to define a space;

providing first and second support wall sections with a gap therebetween, said first support wall section having a first through-hole with an inner diameter therethrough and said second support wall section having a second through-hole with an inner diameter therethrough;

providing a shaft which is to be inserted into said first through-hole and extended through said space and said second through-hole to support said roller bearing, said shaft having a leading end in a direction in which said shaft is to be inserted;

providing a spacer of a predetermined length and shape and being made of an elastic material of a predetermined hardness, said shape being such that said spacer has at least a leading section with a leading end in a direction in which said shaft is to be inserted, said leading section having a peripheral guide surface having an outer diameter which is progressively reduced to said leading end of said leading section and smaller than said inner diameter of the second through-hole, said spacer having a middle section in which a contact support section is provided in at least two separated positions and has a maximum outer diameter of said spacer, said middle section having a length of 1/6 to 166 of said length of said spacer;

inserting said spacer into said space defined by said rollers for supporting said rollers in said roller bearing so that the shape of said spacer is maintained when the spacer is inserted in said space;

positioning said roller bearing in said gap between said first and second wall sections;

inserting said shaft from outside into said first through-hole formed in said first support wall section;

passing said leading end of said shaft through said space defined by said rollers, so that said spacer is pressed out of said second support wall section through said second through-hole; and inserting said leading end of said shaft into said second through-hole in said second support wall section.

2. The method of installing a roller bearing of claim 1 wherein:

said middle section of said spacer is formed in a single cylindrical shape having opposite ends in an axial direction; and comprising the step of providing a contact support section at each of said opposite ends; and wherein said cylindrical section has a length of from 1/6 to ⅓ of said length of said spacer.

3. The method of installing a roller bearing of claim 1 wherein:

said spacer further has a trailing section with a trailing end, and said trailing section is formed with a peripheral guide surface having an outer diameter which is progressively reduced to said trailing end of said trailing section.

4. A method of installing a roller bearing comprising the steps of:

providing a roller bearing comprising an outer ring and a plurality of rollers provided in said outer ring to define a space;

providing first and second support wall sections with a gap therebetween, said first support wall section having a first through-hole with an inner diameter therethrough and said second support wall section having a second through-hole with an inner diameter therethrough;

providing a shaft which is to be inserted into said first through-hole and extended through said space and said second through-hole to support said roller bearing, said shaft having a leading end in a direction in which said shaft is to be inserted;

providing a spacer of a predetermined length and shape and being made of an elastic material of a predetermined hardness, said shape being such that said spacer has at least a leading section with a leading end in a direction in which said shaft is to be inserted, said leading section having a peripheral guide surface having an outer diameter which is progressively reduced to said leading end of said leading section and smaller than said inner diameter of the second through-hole, said peripheral guide surface having an axial length of at least 1/6 of the length of the spacer, said spacer having a middle section in which a contact support section is provided in at least two separated positions and has a maximum outer diameter of said spacer, said middle section having an axial length of at least 1/6 of said length of said spacer between said at least two separated positions;

inserting said spacer into said space defined by said rollers for supporting said rollers in said roller bearing so that the shape of said spacer is maintained when the spacer is inserted in said space;

positioning said roller bearing in said gap between said first and second wall sections;

inserting said shaft from outside into said first through-hole formed in said first support wall section;

passing said leading end of said shaft through said space defined by said rollers, so that said spacer is pressed out of said second support wall section through said second through-hole; and inserting said leading end of said shaft into said second through-hole in said second support wall section.

5. The method of installing a roller bearing of claim 4 wherein:

said middle section of said spacer is formed in a single cylindrical shape having opposite ends in a axial direction; and further comprising the step of providing a contact support section at each of said opposite ends; and wherein said cylindrical section has a length of at least 1/6 of said length of said spacer.

* * * * *

UNITED STATES PATENT AND TRADEMARK OFFICE
CERTIFICATE OF CORRECTION

PATENT NO. : 5,184,402
DATED     : February 9, 1993
INVENTOR(S) : Satoshi Kadokawa It is certified that error appears in the above-identified patent and that said Letters Patent is hereby corrected as shown below:

```
Column 6, line 2, change "1/3" to --2/3--; and
         line 3, change "1/3" to --2/3--.

Column 8, line 29, change "1/3" to --2/3--; and
         line 33, change "1/3" to --2/3--.

Column 9, line 7, change "166" to --2/3--; and
         line 31, change "1/3" to --2/3--.
```

Signed and Sealed this

Nineteenth Day of July, 1994

Attest:

BRUCE LEHMAN

*Attesting Officer*    Commissioner of Patents and Trademarks